United States Patent [19]
Barrett

[11] 3,800,457
[45] Apr. 2, 1974

[54] SELF-HEADING WILD FOWL DECOYS

[76] Inventor: Gilbert R. Barrett, 4492 Redman Ave., Apt. N, Omaha, Nebr. 68111

[22] Filed: May 31, 1972

[21] Appl. No.: 258,417

[52] U.S. Cl. .................................................. 43/3
[51] Int. Cl. ...................................... A01m 31/06
[58] Field of Search ...................................... 43/3

[56] References Cited
UNITED STATES PATENTS

| | | | |
|---|---|---|---|
| 1,066,587 | 7/1913 | Cunningham | 43/3 |
| 2,736,120 | 2/1956 | Lestin | 43/3 |
| 2,787,074 | 4/1957 | Miller | 43/3 |
| 2,441,753 | 5/1948 | Carpenter | 43/3 |
| 2,274,246 | 2/1942 | Riddell | 43/3 |

Primary Examiner—Louis G. Mancene
Assistant Examiner—J. Q Lever
Attorney, Agent, or Firm—Sherman & Shalloway

[57] ABSTRACT

A goose or duck decoy comprising a body portion substantially in the shape of a goose or duck or other wild fowl, the body portion having a flat surface mounted on the body near the posterior of the body along the top center line of the body perpendicular to the top surface of the body, a head portion removably attached to this body portion and a mounting stake, the mounting stake comprising a tubular rod having a pointed end and a flat end and having a first flat, bearing surface attached to the rod, between the flat end and pointed end, the flat end of the rod fitting within a sleeve having a low coefficient of friction within the body of the decoy. The sleeve having a second flat bearing surface attached to the end of the sleeve at the outside of the body such that the two flat bearing surfaces contact each other. These decoys are self-heading i.e., they automatically face into the wind.

3 Claims, 3 Drawing Figures

PATENTED APR 2 1974 3,800,457

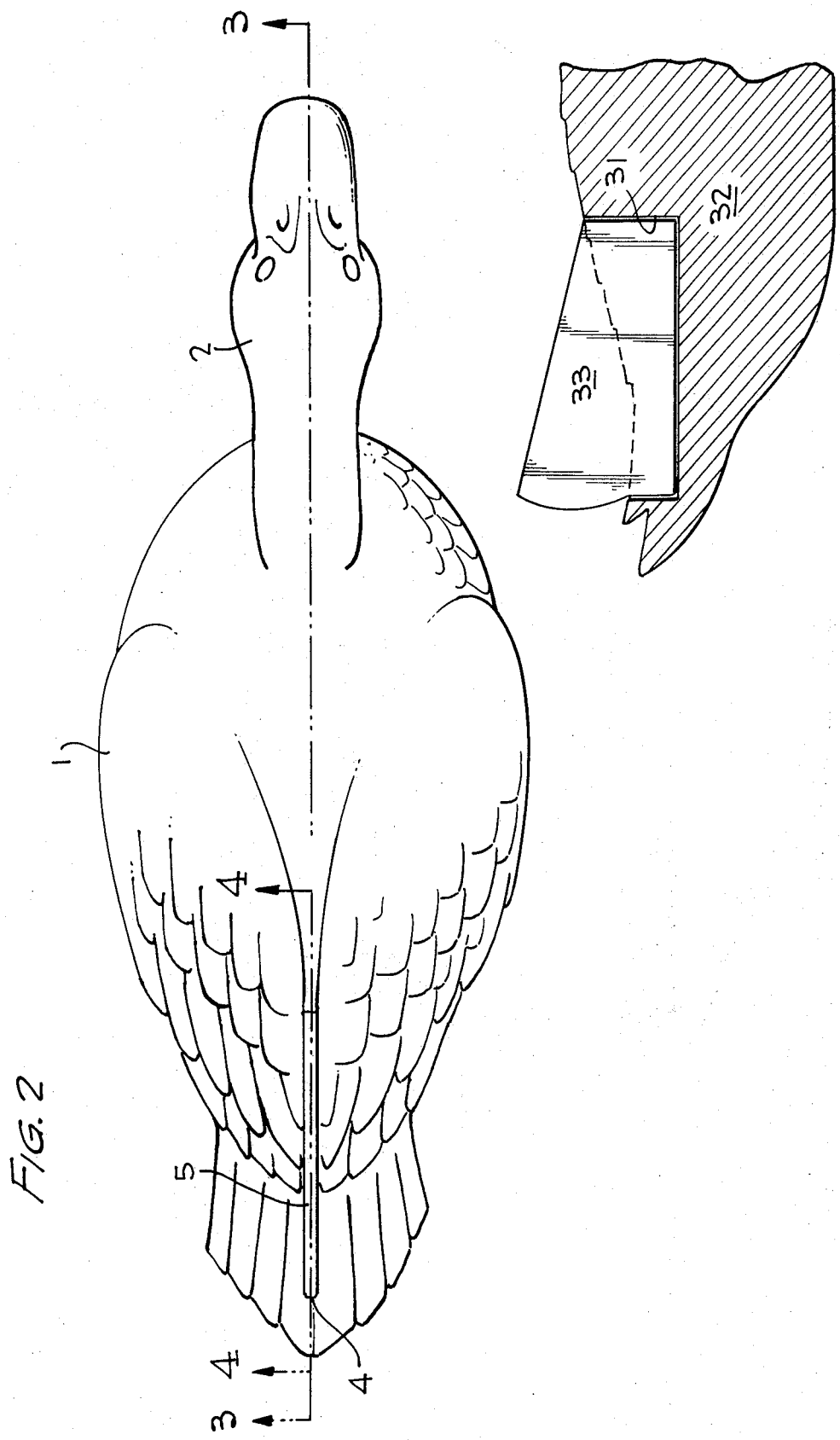

SELF-HEADING WILD FOWL DECOYS

FIELD OF INVENTION

This invention relates to huntings decoys. More particularly, this invention relates to self-aligning decoys for use in hunting game fowl, such as geese, ducks, etc.

BACKGROUND OF INVENTION

Utilization of decoys in order to allure game fowl within the range of hunters' shotguns is a well known expedient. These allures or decoys must be sufficiently realistic so as to fool these ducks and geese flying overhead. Accordingly, when setting out decoys, care must be taken so as to face the decoys into the wind. This is because it is generally the habit of such game fowl to face into the wind. Accordingly, if during a day's hunting the wind changes significantly, the hunter must get out of his hunting blind and adjust or readjust each of the decoys so as to face the same into the wind. Obviously, this becomes a tiring and time consuming chore and can remove some of the enjoyment from duck and geese hunting.

As a result of this problem, there have been many attempts to develop a duck and geese decoy which will be self-adjusting or which can be easily and readily adjusted from the blind without moving out into the sight of the fowl flying overhead. Some of these concepts, such as disclosed in U.S. Pat. No. 2,787,074, utilize a series of pulls or strings so as to manipulate each decoy. Obviously, such operation becomes cumbersome and the pulls or strings may easily become ensnarled in the brush and undergrowth near the duck blind. Furthermore, these are a number of other duck decoys, such as disclosed in U. S. Pat. Nos. 2,719,376, 3,350,808 and 2,885,813 which disclose various decoys having pivoted heads or decoys which are staked into the ground so that the decoys will not be disturbed by high winds or rough waters.

BRIEF DESCRIPTION OF INVENTION

It is within the above environment that the novel decoy of the present invention was developed. Briefly, such decoy comprises a body having an adjustable neck portion, this body having a flat surface extending perpendicular to the top surface of the decoy body near the tail or posterior section along the center line of the body, a sleeve mounted within the body formed from a material having a low coefficient of friction, this sleeve including a flat, circular, bearing surface, and a stake for mounting the decoy having a flat end and a pointed end and having a circular, flat, bearing surface disposed intermediate the pointed and the flat end. These novel decoys automatically adjust to changes in the wind so that they always face into the wind.

It is therefore the primary object of the present invention to provide a self-aligning duck or goose decoy.

It is a further object of the present invention to provide a self-aligning duck or goose decoy which presents the appearance of a live goose or duck from the air and which will automatically and, without any manual manipulation, align itself so as to face directly into the wind.

It is a still further object of the present invention to provide a self-aligning decoy with a minimum of moving parts so that the same may be quickly and easily carried and assembled in the field.

BRIEF DESCRIPTION OF DRAWINGS

Still further objects and advantages of the novel decoys of the present invention will become more apparent from the following, more detailed description thereof and the attached drawings wherein:

FIG. 2 is a top view of the novel decoy of the present invention;

FIG. 4 is a view taken along line 4—4 in FIG. 2 showing an alternative embodiment of the decoy of the present invention.

DESCRIPTION OF PREFERED EMBODIMENTS

Figure 1:
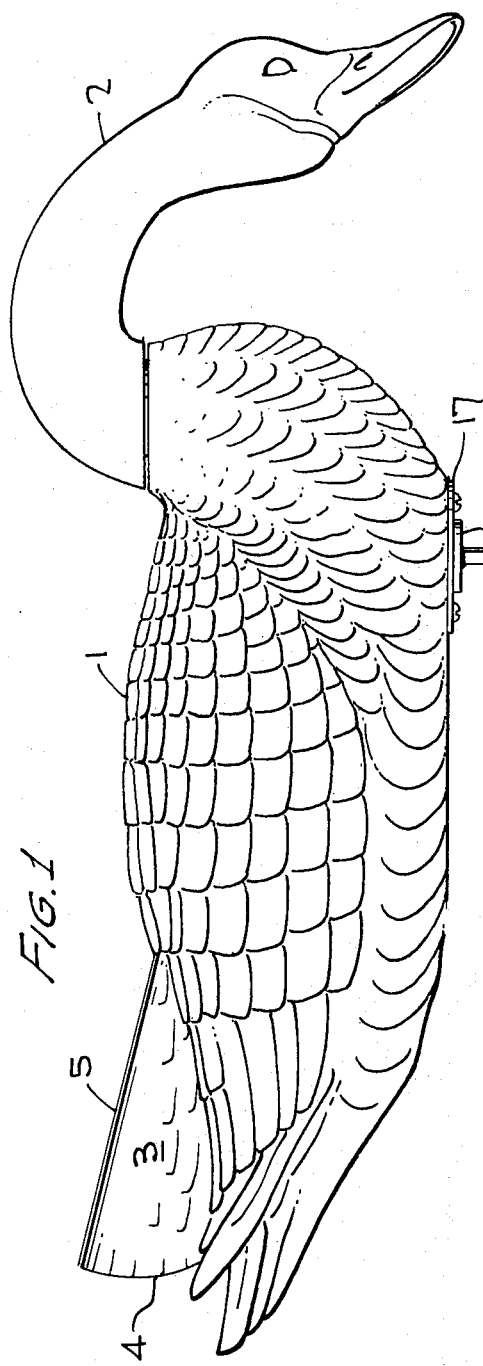
FIG. 1 is a side view of the novel decoy of the present invention.

FIGS. 1 and 2 show a side view and a top view respectively of the novel decoy of the present invention. The decoy comprises a body portion 1 which has a removable head portion 2, generally body portion 1 and head portion 2 may be made of any light weight, durable material, such as fiber glass, solid styrene foams, and other similar materials. Head 2 may be made removable so that the decoy may be modified to provide a decoy having three separate head positions, i.e., alert, asleep, and feeding. Attached to the posterior portion of body portion 1 is a flat fin 3. Fin 3 may be integrally formed with body portion 1 so that the same has a one piece construction or may be a removable insert. Fin 3 will be substantially perpendicular to the ground when the decoy is set up and will act as a wind deflector to maintain the decoy in the proper position. Fin 3 should be placed on the rearward portion of the decoy body, preferably inset slightly from the end of the tail feathers or posterior portion and extending substantially up the center line of the back or top portion of the decoy body 1. Generally, the shape of the fin 3 will be somewhat triangular with the back edge 4 of fin 3 being generally perpendicular with respect to the ground, joined by a top edge 5 which may be either substantially horizontal to the base of the decoy or extended on a slight angle substantially shown in FIG. 1. Furthermore, fin 3 may be decorated in a manner similar to that of body portion 1 so that when viewed from the air, it does not substantially detract from the general overall appearance of the decoy and appears to generally resemble a ruffled wing feather.

Figure 3:
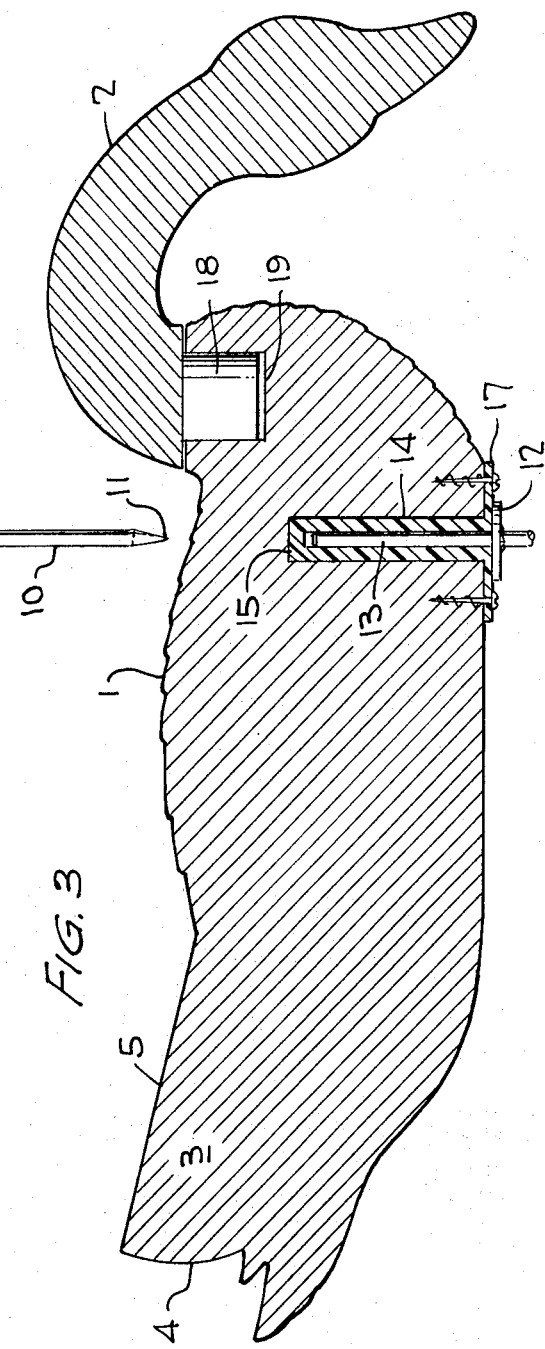
FIG. 3 is a view taken along line 3—3 in FIG. 2.

FIG. 3 which shows a view on line 3—3 in FIG. 2, shows the pivot structure of the novel decoy of the present invention. Generally, body portion 1 is mounted on a stake 10 made of a suitable metal material, such as a steel alloy, and has a pointed end 11 so that stake 10 may be easily driven or pushed into the ground. The end of stake 10 opposite from that of point 11 is generally flat and intermediate these ends is a flange 12 which is generally circular when viewed from above and provides a flat, bearing surface. Upper portions 13 of stake 10, i.e. that portion of stake 10 above flange 12, fits into a sleeve 14 which is embedded within the body 1 of the decoy. Sleeve 14 may be either a metal sleeve without any coating whatsoever or may be include a nylon or polytetrafluoroethylene coating so as to reduce any possible friction between the upper portion 13 of stake 10 and the sleeve 14, allowing the decoy to freely rotate.

Sleeve 14 may be either a tubular member with both ends open or the upper end 15 may be closed. At the lower end 16 of sleeve 14 is a flat, bearing surface 17 slightly larger than flange member 12 on stake 10. When the upper portion 13 of stake 10 is inserted into sleeve 14, flange member 12 and surface 17 mate so as to form a sliding surface allowing the duck body 1 to freely rotate in response to any wind which hits fin 3.

FIG. 4 shows a view along line 4—4 in FIG. 2 and shows an alternative construction for fin 3. In this embodiment, a fin member 33 fits within a thin, elongated slit 31 in the body of decoy 32. Fin 33 and slit 31 will generally be approximately the same size in width and length dimensions so that fin 33 fits easily within slit 31; the dimensions should be sufficiently similar so that fin 33 will not be easily inadvertently removed. Preferably, slit 31 will be sufficiently deep so that fin 33 will not be removed by the action of the wind blowing transverse to the fin 33. The utilization of this particular embodiment presents the advantage that these fin members may be removed prior to transporting the decoys, thereby avoiding the possibility of breakage of the fins, since the fin members are generally fairly thin although they are sturdy.

In use, the decoys are set out in the fields in a manner similar to conventional decoys. Each stake 10 is placed into the ground and the decoy with an appropriate head is placed thereon. As noted above and as shown in FIG. 3, the head 2 is removable, each head having a cylindrical plug 18 which fits into a cylindrical socket 19 in the upper portion of the body 1 of the decoy. Accordingly, the hunter can vary the number of decoys with heads being alert, sleeping or feeding depending upon the time of the day. Once decoys are set out, the hunter may return to his blind without the necessity of adjusting the same due to constant changes in wind since decoy will align itself with the head facing into the wind. Furthermore, any small cross winds which hit fin 3 will cause the decoys to wabble or move slightly, thereby creating the illusion from the air that the decoys are live and moving. The instant decoys without the utilization of any outside force present the illusion of live, wild fowl which constantly shift their position with reference to the prevailing wind.

Although the novel decoy of the present invention has been described by way of the foregoing specification and attached drawings, such novel decoy is to be in no way limited thereto, but to be construed as broadly as any and all equivalents in the following appended claims.

What is claimed is:

1. A self-aligning wild fowl decoy comprising a body substantially in the shape of a wild fowl including a head portion, a main body portion, a substantially flat base portion and a posterior portion; a thin substantially flat fin mounted on said body near said posterior portion along the top center line of said main body portion said fin being generally triangular and mounted generally perpendicular to the top surface of said posterior portion with its posterior edge generally perpendicular to said base portion; a tubular sleeve mounted within said main body portion near said head portion and perpendicular to said base portion forming an opening in said base portion, said sleeve having a low coefficient of friction; a first flat bearing surface attached to said sleeve and to said base portion; and a cylindrical mounting stake having a cross-section slightly less than the internal diameter of said sleeve said stake and including a flat end and a pointed end and further including a second flat bearing surface attached to said stake intermediate said pointed end and said flat end, said second flat bearing surface contracting said first bearing surface when said flat end is inserted into said sleeve.

2. The Decoy of claim 1 wherein said fin is integral with said body.

3. The Decoy of claim 1 wherein said fin is removable.

* * * * *